(12) United States Patent  
Aoki

(10) Patent No.: US 12,427,886 B2  
(45) Date of Patent: Sep. 30, 2025

(54) CHARGING SYSTEM

(71) Applicant: TOYOTA JIDOSHA KABUSHIKI KAISHA, Toyota (JP)

(72) Inventor: Yuya Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 624 days.

(21) Appl. No.: 17/895,484

(22) Filed: Aug. 25, 2022

(65) Prior Publication Data

US 2023/0063810 A1 Mar. 2, 2023

(30) Foreign Application Priority Data

Aug. 27, 2021 (JP) ................. 2021-139137

(51) Int. Cl.
*B60L 53/56* (2019.01)
*B60L 53/16* (2019.01)
*B60L 53/62* (2019.01)
*B60L 53/66* (2019.01)

(52) U.S. Cl.
CPC ............. *B60L 53/665* (2019.02); *B60L 53/16* (2019.02); *B60L 53/62* (2019.02)

(58) Field of Classification Search
CPC ........ B60L 53/665; B60L 53/16; B60L 53/62; B60L 53/68; B60L 53/64; Y02T 10/70; Y02T 10/7072; Y02T 90/12; Y02T 90/14
USPC ....................................... 320/109
See application file for complete search history.

(56) References Cited

U.S. PATENT DOCUMENTS

| 2013/0009599 A1* | 1/2013 | Yukizane .............. B60L 53/665 320/109 |
| 2018/0111495 A1 | 4/2018 | Kinomura |
| 2019/0031040 A1 | 1/2019 | Kinomura |
| 2019/0252906 A1 | 8/2019 | Kusumi |
| 2020/0266633 A1 | 8/2020 | Baumann et al. |

FOREIGN PATENT DOCUMENTS

| CN | 107370194 A | 11/2017 |
| JP | 2013-198372 A | 9/2013 |
| JP | 2018-074673 A | 5/2018 |
| JP | 2019-140827 A | 8/2019 |
| JP | 2020-078183 A | 5/2020 |
| JP | 2020-120529 A | 8/2020 |

* cited by examiner

*Primary Examiner* — Paul Dinh
(74) *Attorney, Agent, or Firm* — Sughrue Mion, PLLC

(57) ABSTRACT

A charging system includes a charging device that includes a plug and a charger which supplies electric power to the plug, a vehicle that includes an inlet to which the plug is connected and a power storage device to which electric power is supplied through the inlet, and a notification device that notifies a user of information. The charging device is capable of switching a charging mode from a normal charging mode to a power limited mode in which the charging power is smaller than the normal charging mode. When the charge fee required to complete the charging in the power limited mode is higher than the charge fee required to complete the charging in the normal charging mode, the notification device inquires the user about whether or not to switch the charging mode to the power limited mode.

5 Claims, 4 Drawing Sheets

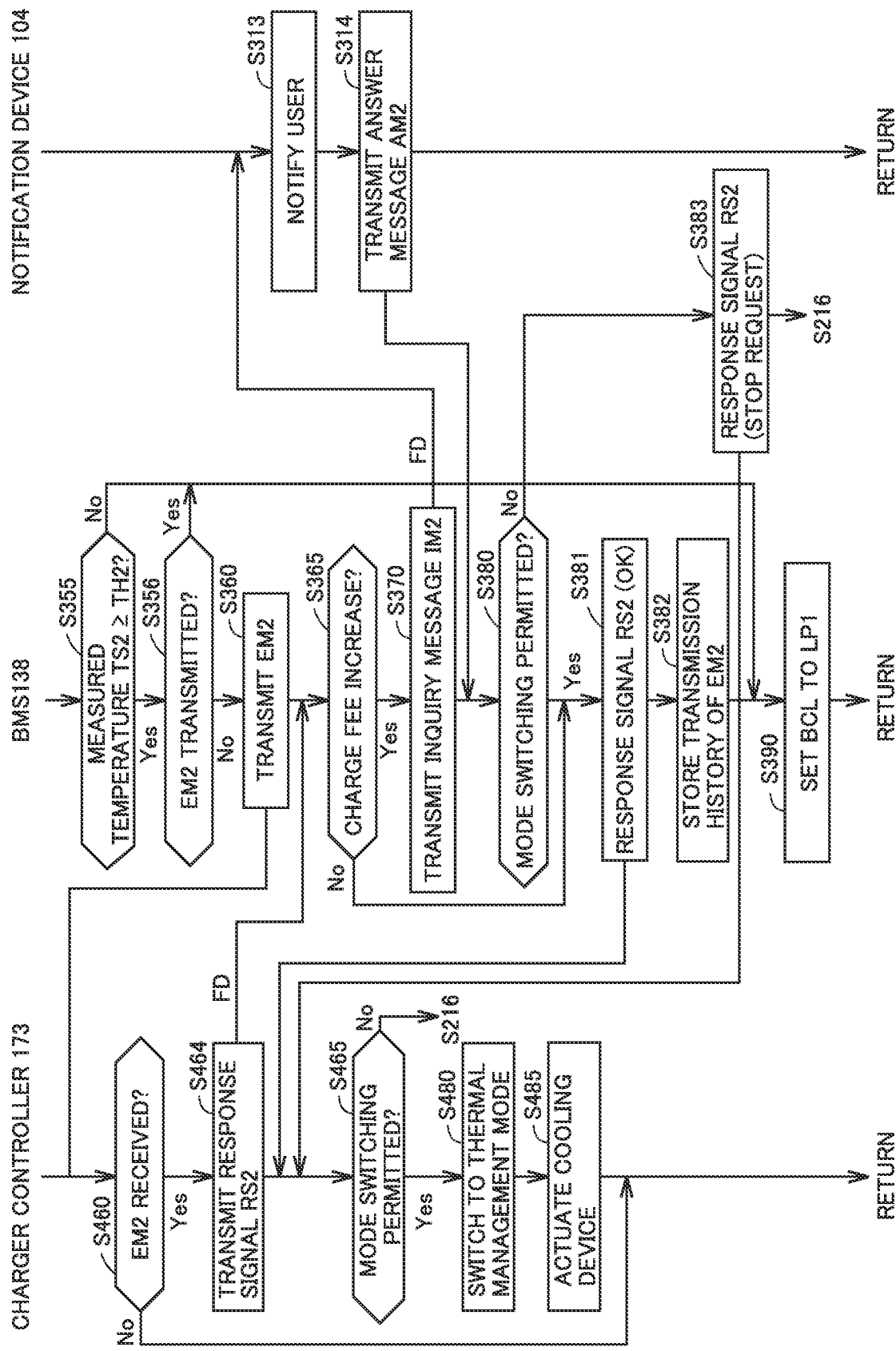

CHARGING SYSTEM

This non-provisional application is based on Japanese Patent Application No. 2021-139137 filed on Aug. 27, 2021 with the Japan Patent Office, the entire contents of which are hereby incorporated by reference.

BACKGROUND

Field

The present disclosure relates to a charging system.

Description of the Background Art

Various types of charging systems have been proposed. Such a charging system includes a vehicle that includes a power storage device and an inlet, and a charging device that includes a charging plug to be connected to the inlet and a charger configured to charge the power storage device.

For example, a charging device described in Japanese Patent Laying-Open No. 2020-120529 includes a user interface that notifies a user of information about the vehicle and a control device that controls charging power.

The charging device controls the charging power to be charged to the power storage device in such a manner that the charging power will not exceed a charging power upper limit. Further, during an external charging, when the charging power upper limit drops to a threshold value which is lower than a maximum charging power by a predetermined amount, the charging device inquires the user about whether or not to terminate the external charging via the user interface.

SUMMARY

During the charging, the charging device may reduce the charging power in response to various factors, which makes the charge time longer than that in the case where the charging power is not reduced.

If the charge fee increases as the charge time becomes longer, for example, if the charge fee increases in proportion to the charge time, the charge fee increases against the user's intention.

The present disclosure has been made to solve the aforementioned problems, and an object of the present disclosure is to provide a charging system capable of preventing a charge fee from increasing against a user's intention when a charging power is reduced during charging.

The charging system of the present disclosure includes: a charging device that includes a plug and a charger which supplies electric power to the plug; a vehicle that includes an inlet to which the plug is connected and a power storage device to which electric power is supplied through the inlet; and a notification device that notifies a user of information, wherein the charging device is capable of switching a charging mode from a normal charging mode to a power limited mode in which the charging power is smaller than that in the normal charging mode, and when the charge fee required to complete the charging in the power limited mode is higher than the charge fee required to complete the charging in the normal charging mode, the notification device inquiring the user about whether or not to switch the charging mode to the power limited mode.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a flowchart illustrating a continuation of the charging phase (S215) illustrated in FIG. 4.

DESCRIPTION OF THE PREFERRED EMBODIMENTS

Figure 1:
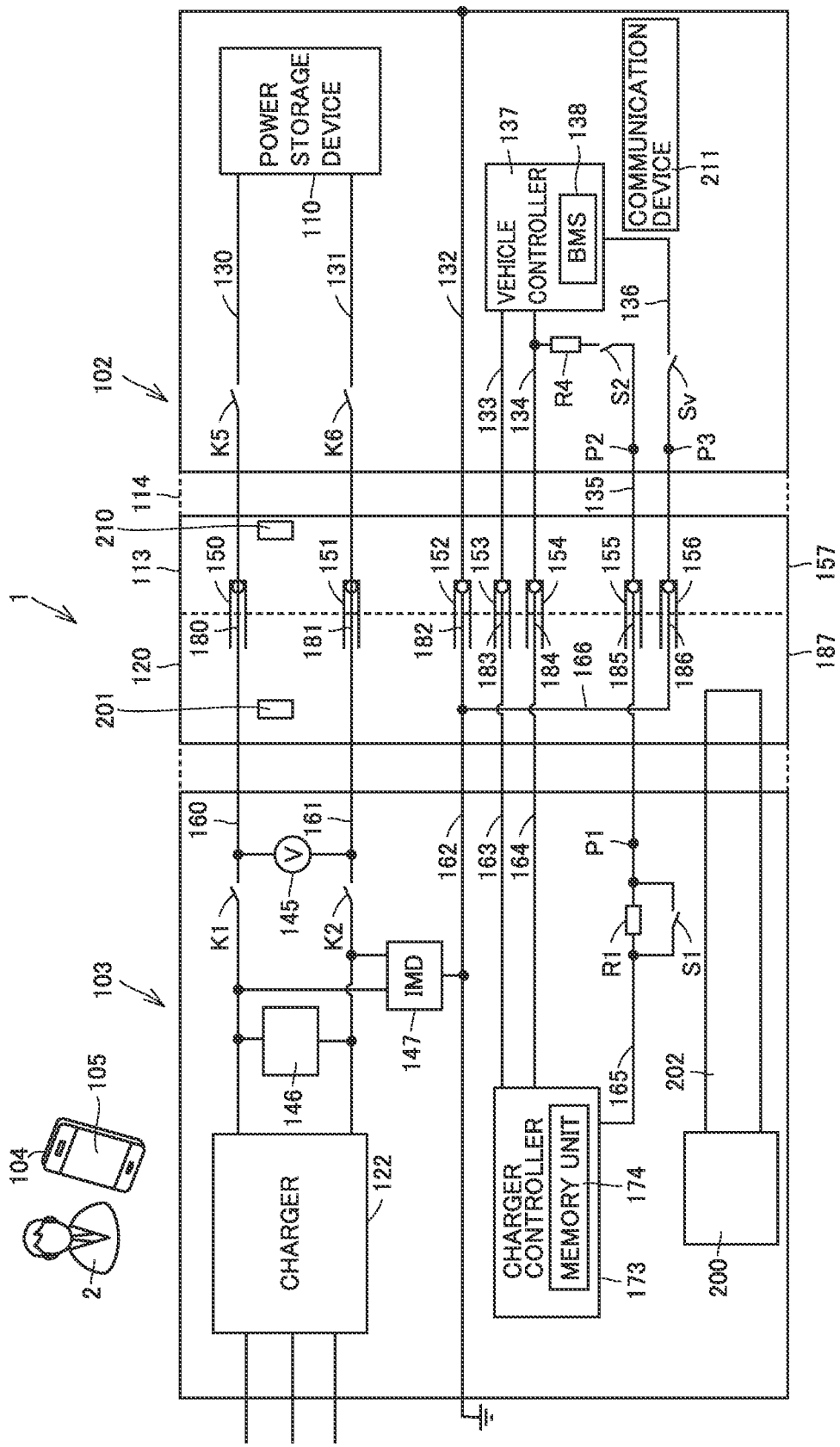
FIG. 1 is a block diagram schematically illustrating a charging system 1 according to an embodiment.

A charging system 1 according to an embodiment of the present disclosure will be described with reference to FIGS. 1 to 5. In FIGS. 1 to 5, the same or substantially the same components are denoted by the same reference numerals, and the description thereof will not be repeated.

FIG. 1 is a block diagram schematically illustrating the charging system 1 according to an embodiment of the present disclosure. The charging system 1 includes a vehicle 102, a charging device 103, and a notification device 104.

The notification device 104 is, for example, an information terminal to be used by a user 2 such as a smartphone or the like. The notification device 104 includes a screen 105. The screen 105 is configured to display various kinds of information to be notified to the user 2. The user 2 can input various kinds of information by operating the screen 105, and the screen 105 may function as an input unit.

The vehicle 102 includes a power storage device 110, a charging inlet 113, a power line 114, a vehicle controller 137, a temperature sensor 210, and a communication device 211.

The charging inlet 113 includes a DC (+) terminal 150, a DC (−) terminal 151, a PE terminal 152, an S (+) terminal 153, an S (−) terminal 154, a CC1 terminal 155, a CC2 terminal 156, and a housing 157. The terminals 150 to 156 are accommodated in the housing 157, and are insulated from each other. The temperature sensor 210 is provided in the charging inlet 113, and is configured to measure a temperature of the charging inlet 113. The temperature sensor 210 transmits the measured temperature to the vehicle controller 137.

The vehicle 102 further includes a DC (+) line 130, a DC (−) line 131, a PE line 132, an S (+) signal line 133, an S (−) signal line 134, a CC1 communication line 135, a CC2 communication line 136, a contactor K5, a contactor K6, a switch S2, and a switch Sv.

One end of the DC (+) line 130 and one end of the DC (−) line 131 are connected to the power storage device 110, the other end of the DC (+) line 130 is connected to the DC (+) terminal 150, and the other end of the DC (−) line 131 is connected to the DC (−) terminal 151. The PE line 132 is a ground line, and is connected to the PE terminal 152.

One end of the S (+) signal line 133, one end of the S (−) signal line 134, one end of the CC1 communication line 135, and one end of the CC2 communication line 136 are connected to the vehicle controller 137. The other end of the S (+) signal line 133 is connected to the S (+) terminal 153, and the other end of the S (−) signal line 134 is connected to the S (−) terminal 154. The other end of the CC1 communication line 135 is connected to the CC1 terminal 155, and the other end of the CC2 communication line 136 is connected to the CC2 terminal 156.

The contactor K5 is provided on the DC (+) line 130, and the contactor K6 is provided on the DC (−) line 131. The CC1 communication line 135 is provided with a resistor R4, and the switch S2 is connected to the CC1 communication line 135 in series with the resistor R4. The switch Sv is provided on the CC2 communication line 136. The vehicle controller 137 controls ON/OFF of the contactors K5 and K6 and ON/OFF of the switches S2 and Sv.

The vehicle controller 137 is provided with a battery management system (BMS) 138. The BMS 138 includes a memory unit 139. The memory unit 139 stores a version message, discharge compatibility information, an identification message, a charging parameter message BCP, a threshold temperature TH1, and the like. The communication device 211 is configured to transmit various kinds of information to or receive various kinds of information from the notification device 104.

The charging device 103 includes a charger 122, a DC (+) line 160, a DC (−) line 161, a PE line 162, an S (+) signal line 163, an S (−) signal line 164, a CC1 communication line 165, a CC2 communication line 166, a contactor K1, a contactor K2, a switch S1, a voltage measuring device 145, a bleeder circuit 146, an insulation monitoring device (IMD) 147, a charger controller 173, a cooling device 200, a temperature sensor 201, and a heat transfer member 202.

The plug 120 includes a DC (+) terminal 180, a DC (−) terminal 181, a PE terminal 182, an S (+) terminal 183, an S (−) terminal 184, a CC1 terminal 185, a CC2 terminal 186, and a housing 187. Each terminal is accommodated in the housing 187. The temperature sensor 201 is provided in the plug 120, and is configured to measure a temperature of the plug 120. The temperature sensor 201 transmits the measured temperature to the charger controller 173.

The heat transfer member 202 is connected between the plug 120 and the cooling device 200. For example, the heat transfer member 202 includes a refrigerant pipe hollow inside and a liquid refrigerant flowing through the refrigerant pipe. The cooling device 200 cools the heat transfer member 202 by exchanging heat transferred through the heat transfer member 202 with outside air. Thus, the temperature of the plug 120 is prevented from increasing during the charging.

One end of the DC (+) line 160 and one end of the DC (−) line 161 are connected to the charger 122. The other end of the DC (+) line 160 is connected to the DC (+) terminal 180, and the other end of the DC (−) line 161 is connected to the DC (−) terminal 181. The PE line 162 is a ground line, and is connected to the PE terminal 182.

One end of the S (+) signal line 163, one end of the S (−) signal line 164, and one end of the CC1 communication line 165 are connected to the charger controller 173. The other end of the S (+) signal line 163 is connected to the S (+) terminal 183, and the other end of the S (−) signal line 164 is connected to the S (−) terminal 184.

The other end of the CC1 communication line 165 is connected to the CC1 terminal 185. One end of the CC2 communication line 166 is connected to the PE line 162, and the other end of the CC2 communication line 166 is connected to the CC2 terminal 186.

The contactor K1 is provided on the DC (+) line 160, and the contactor K2 is provided on the DC (−) line 161. The CC1 communication line 165 is provided with a resistor R1, and the switch S1 is connected to the CC1 communication line 165 in parallel with the resistor R1.

The voltage measuring device 145 is connected between the DC (+) line 160 and the DC (−) line 161. Specifically, the voltage measuring device 145 is connected between the DC (+) line 160 at a position between the DC (+) terminal 180 and the contactor K1 and the DC (−) line 161 at a position between the DC (−) terminal 181 and the contactor K2.

The IMD 147 is connected between the DC (+) line 160 at a position between the charger 122 and the contactor K1 and the DC (−) line 161 at a position between the charger 122 and the contactor K2. The IMD 147 is further connected to the PE line 162. The bleeder circuit 146 is connected between the DC (+) line 160 at a position between the charger 122 and the contactor K1 and the DC (−) line 161 at a position between the charger 122 and the contactor K2.

When the plug 120 is connected to the charging inlet 113, the DC (+) terminal 180 is connected to the DC (+) terminal 150, and the DC (−) terminal 181 is connected to the DC (−) terminal 151. The PE terminal 182 is connected to the PE terminal 152, and the S (+) terminal 183 is connected to the S (+) terminal 153. The S (−) terminal 184 is connected to the S (−) terminal 154, and the CC1 terminal 185 is connected to the CC1 terminal 155. The CC2 terminal 186 is connected to the CC2 terminal 156.

The charger controller 173 includes a memory unit 174. The memory unit 174 stores a version message, discharge compatibility information, an identification message, a charger time synchronization information message CTS, a charger maximum output power message CML, a charger charging/discharging direction message CCD, a threshold temperature TH2, and a charge fee setting information FD related to a charge fee. The threshold temperature TH2 indicates an allowable temperature of the plug 120.

Figure 2:
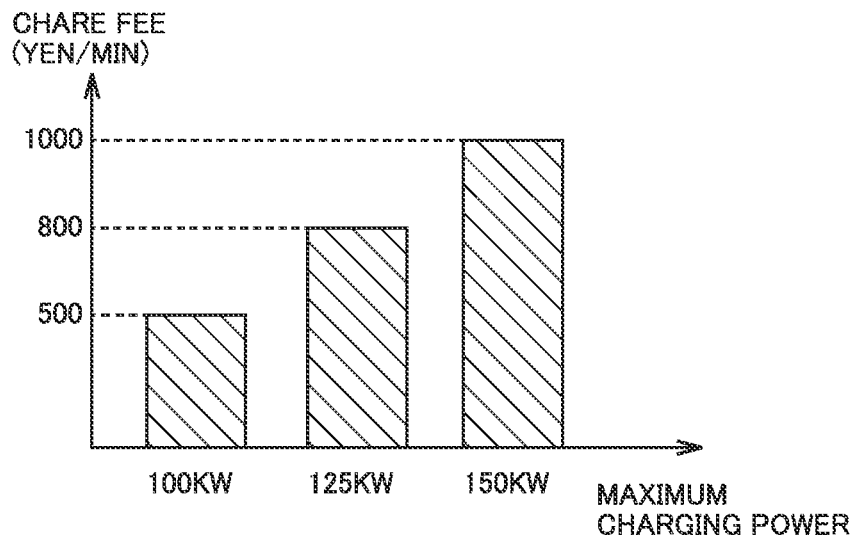
FIG. 2 is a graph schematically illustrating a charge fee setting information FD.

FIG. 2 is a graph schematically illustrating a charge fee setting information FD. In the graph illustrated in FIG. 2, the vertical axis represents a unit price (yen/min) of the charge fee, and the horizontal axis represents a maximum charging power (kw). In the example illustrated in FIG. 2, the charge fee varies in accordance with the maximum charging power.

The vehicle controller 137 periodically monitors detection points P2 and P3, and the charger controller 173 periodically monitors a detection point P1.

The charger controller 173 controls the charger 122, the ON/OFF of the switch S1, and the ON/OFF of the contactors K1 and K2.

The vehicle controller 137 controls the ON/OFF of the switches S2 and Sv and the ON/OFF of the contactors K5 and K6.

When the plug 120 is connected to the charging inlet 113 as described above, various controls for the charging are performed.

Figure 3:
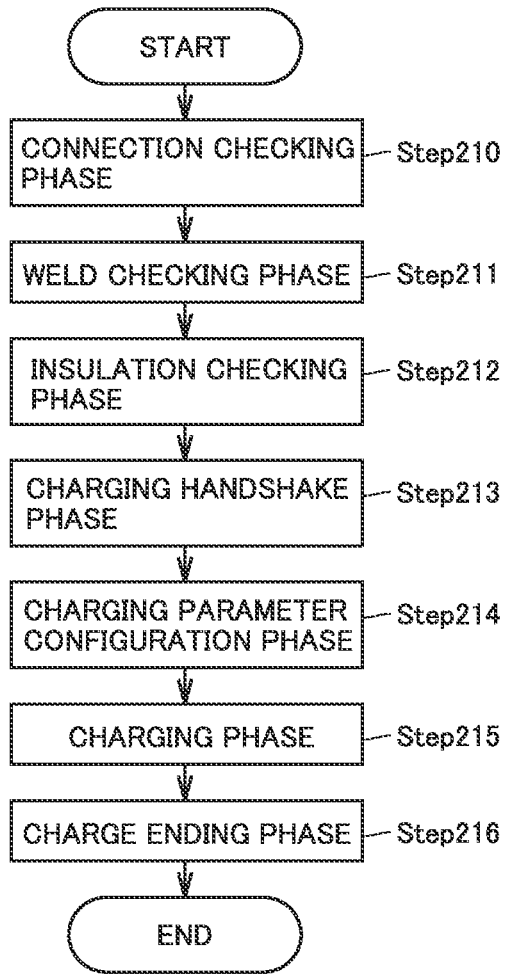
FIG. 3 is a flowchart schematically illustrating a charging flow.

FIG. 3 is a flowchart schematically illustrating a charging flow. With reference to FIG. 3, the charging flow includes a connection checking phase (S210), a weld checking phase (S211), an insulation checking phase (S212), a charging handshake phase (S213), a charging parameter configuration phase (S214), a charging phase (S215), and a charge ending phase (S216).

The connection checking phase (S210) is a phase in which whether or not the plug 120 is connected to the charging inlet 113 is checked. When the vehicle controller 137 determines that the plug 120 is connected to the charging inlet 113, the vehicle controller 137 locks the plug 120 to the charging inlet 113.

The welding checking phase (S211) is a phase in which whether or not the contactors K5 and K6 are not welded is checked.

The insulation checking phase (S212) is a phase in which the insulation state between the DC (+) line 160 and the DC (−) line 161 and the insulation state between the DC (+) terminal 180 and the DC (−) terminal 181 are checked.

The charging handshake phase (S213) is a phase in which the BMS 138 and the charger controller 173 exchange the version message, the discharge compatibility information, and the identification message.

The charging parameter configuration phase (S214) is a phase in which the charger controller 173 and the BMS 138 exchange various charging parameter messages and the like to determine whether or not the charger and the vehicle are chargeable.

The charging parameter message BCP is transmitted by the BMS 138 to the charger controller 173, and includes information about an allowable maximum charging power, an allowable maximum charging current, an allowable maximum charging voltage, an allowable temperature and the like. The charger controller 173 transmits the charger time synchronization information message CTS, the charger maximum output power message CML, and the charger charging/discharging direction message CCD to the BMS 138.

When the BMS 138 determines that the vehicle is chargeable, the BMS 138 transmits a charging ready message BRO to the charger controller 173. When the charger controller 173 determines that the charger is chargeable, the charger controller 173 transmits a charger ready message CRO to the BMS 138.

The charging phase (S215) will be described later with reference to FIG. 4. In the charge ending phase (S216), the operation of the charger 122 is stopped, which terminates the power supply from the charging device 103. Then, the contactors K1, K2, K5 and K6 are turned off.

Figure 4:
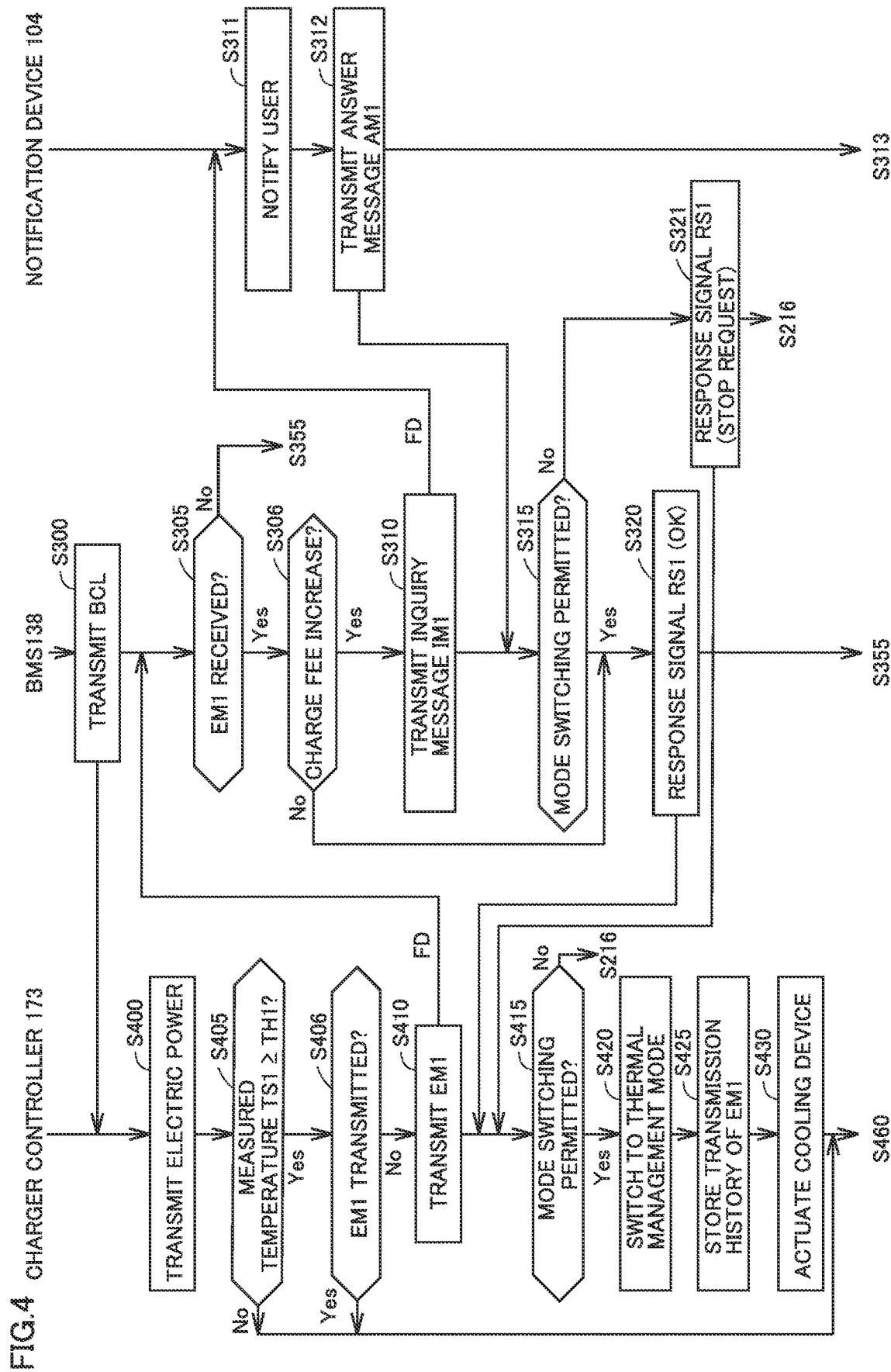
FIG. 4 is a flowchart specifically illustrating a charging phase (S215)

FIG. 4 is a flowchart specifically illustrating the charging phase (S215).

The BMS 138 transmits a battery charging demand message BCL to the charger controller 173 (S300). The battery charging demand message BCL in the initial state includes information about a demanded power (W), a demanded voltage (V), a demanded current (A), and the like. In the present embodiment, the demanded power is set to the allowable maximum charging power, and the demanded voltage and the demanded current are set in accordance with the demanded power.

Upon receiving the battery charging demand message BCL, the charger controller 173 controls the charger 122 to supply electric power in accordance with information included in the battery charging demand message BCL (S400). In the present disclosure, the charging mode in which the charging device 103 performs charging in accordance with the battery charging demand message BCL is referred to as a normal charging mode.

The charger controller 173 acquires a measured temperature TS1 from the temperature sensor 201, and determines whether or not the measured temperature TS1 is equal to or higher than the threshold temperature TH1 (S405). If it is determined that the measured temperature TS1 is equal to or higher than the threshold temperature TH1 (Yes in S405), the charger controller 173 determines whether or not an error message EM1 has been transmitted to the BMS 138 (S406). If it is determined that the error message EM1 has been transmitted (Yes in S406), the process proceeds to S460. On the other hand, if it is determined that the error message EM1 has not been transmitted (No in S406), the charger controller 173 transmits the error message EM1 to the BMS 138 (S410). The error message EM1 includes a charge fee setting information FD and information about a low power LP when the charging mode is switched to a thermal management mode. The thermal management mode is a charging mode in which the output power (charging power) is set lower than the output power in the normal charging mode to be described later. Thereby, the temperature of the plug 120 is prevented from increasing.

After the BMS 138 transmits the battery charging demand message BCL to the charger controller 173, the BMS 138 determines whether or not the error message EM1 has been received (S305).

When the BMS 138 determines that the error message EM1 has not been received (No in S305), the process proceeds to S355 to be described later. On the other hand, when the BMS 138 determines that the error message EM1 has been received (Yes in S305), the BMS 138 determines whether or not the switching to the thermal management mode will increase the charge fee (S306).

Specifically, the BMS 138 determines, based on the charge fee setting information FD, that the charge fee will not increase even if the charging mode is switched to the thermal management mode when the charge fee is a fixed fee or a charge fee system in which the charge fee increases as the amount of charging power increases.

The BMS 138 determines the charge fee will increase if the charging mode is switched to the thermal management mode when the charge fee is a charge fee system in which the charge fee increases in response to the maximum output power as illustrated in FIG. 2 or a charge fee system in which the charge fee increases in response to the charge time.

The BMS 138 may specifically calculate a difference in the charge fee based on a current SOC (State of Charge) of the power storage device 110, an output power when the charging mode is switched to the thermal management mode, a charging power in the normal charging mode, and the like.

When the BMS 138 determines that the charge fee will increase if the charging mode is switched to the thermal management mode (Yes in S306), the BMS 138 transmits an inquiry message IM1 to the notification device 104 (S310). When the BMS 138 determines that the charge fee will not increase if the charging mode is switched to the thermal management mode (No in S306), the process proceeds to S320 to be described later.

The inquiry message IM1 is a message for inquiring whether or not to switch the charging mode to the thermal management mode if the switching of the charging mode to the thermal management mode will increase the charge fee. The inquiry message IM1 may include information about a difference in the charge fee if the charging mode is switched to the thermal management mode.

Upon receiving the inquiry message IM1, the notification device 104 notifies the user 2 of the inquiry message IM1. For example, the notification device 104 displays the inquiry message IM1 on the screen 105. The user 2 can confirm the inquiry message IM1 displayed on the screen 105. The screen 105 may display, for example, information indicating that the temperature of the plug 120 is increased, information indicating that the switching to the thermal management mode is desired, and information indicating the charge fee. The user 2 operates the screen 105 to input whether or not to switch the charging mode to the thermal management mode. The notification device 104 transmits an answer message AM1 to the BMS 138 (S312). The answer message AM1 includes information indicating whether or not to switch the charging mode.

Upon receiving the answer message AM1, the BMS 138 determines whether or not to switch the charging mode to the thermal management mode (S315).

When the BMS 138 determines that it is permitted to switch the charging mode to the thermal management mode (Yes in S315), the BMS 138 transmits a response signal RS1 including a flag that permits the switching to the thermal management mode to the charger controller 173 (S320). On the other hand, when the BMS 138 determines that it is not permitted to switch the charging mode to the thermal management mode (No in S315), the BMS 138 transmits a response signal RS1 including a flag of stopping the charging to the charger controller 173 (S321). After the BMS 138 transmits the response signal RS1 including a flag of stopping the charging, the process proceeds to S216.

Upon receiving the response signal RS1, the charger controller 173 determines whether or not it is permitted to switch the charging mode to the thermal management mode (S415).

When the charger controller 173 determines that it is not permitted to switch the charging mode to the thermal management mode (the response signal RS1 includes a flag of stopping the charging) (No in S415), the charger controller 173 stops the charging (S216).

On the other hand, when the charger controller 173 determines that it is permitted to switch the charging mode to the thermal management mode (Yes in S415), the charger controller 173 switches the charging mode to the thermal management mode (S420).

Then, the charger controller 173 controls the charger 122 to supply electric power at the low power LP. Then, the charger controller 173 stores the transmission history of the error message EM1 in the memory unit 174 (S425). Then, the charger controller 173 actuates the cooling device 200 (S430). The actuated cooling device 200 cools the plug 120 through the heat transfer member 202.

FIG. 5 is a flowchart illustrating a continuation of the charging phase (S215) illustrated in FIG. 4. The BMS 138 acquires a measured temperature TS2 from the temperature sensor 210, and the BMS 138 determines whether or not the measured temperature TS2 is equal to or higher than the threshold temperature TH2 (S355).

When the BMS 138 determines that the measured temperature TS2 is equal to or higher than the threshold temperature TH2 (Yes in S355), the BMS 138 determines whether or not the error message EM2 has been transmitted to the charger controller 173 (S356).

When the BMS 138 determines that the error message EM2 has been transmitted to the charger controller 173 (Yes in S356), the process proceeds to S390. On the other hand, when there is no history of transmitting the error message EM2, the BMS 138 transmits the error message EM2 to the charger controller 173 (S360).

The charger controller 173 determines whether or not the error message EM2 has been received (S460). When the charger controller 173 determines that the error message EM2 has been received (Yes in S460), the charger controller 173 transmits a response signal RS2 to the BMS 138 (S464). The response signal RS2 includes the charge fee setting information FD.

The BMS 138 determines whether or not the charge fee will increase based on the charge fee setting information FD (S365). The determination approach is the same as that described in S306.

When the BMS 138 determines that the charge fee will increase (S365), the BMS 138 transmits an inquiry message IM2 to the notification device 104. The inquiry message IM2 includes the charge fee setting information FD and information about the low power LP. The notification device 104 notifies the user of the inquiry message IM2 (S313). Then, the notification device 104 transmits an answer message AM2 that includes information input by the user 2 to the BMS 138 (S314). The answer message AM2 includes information indicating whether or not it is permitted to switch the charging mode.

Upon receiving the answer message AM2, the BMS 138 determines whether or not it is permitted to switch the charging mode to the thermal management mode (S380). When the BMS 138 determines that it is permitted to switch the charging mode to the thermal management mode (Yes in S380), the BMS 138 transmits a response signal RS2 including a flag that permits the switching to the thermal management mode to the charger controller 173 (S381). On the other hand, when the BMS 138 determines that it is not permitted to switch the charging mode to the thermal management mode (No in S380), the BMS 138 transmits a response signal RS2 including a flag of stopping the charging to the charger controller 173 (S383).

Upon receiving the response signal RS2, the charger controller 173 determines whether or not it is permitted to switch the charging mode to the thermal management mode (S465).

When the charger controller 173 determines that it is not permitted to switch the charging mode to the thermal management mode (the response signal RS2 includes a flag of stopping the charging) (No in S465), the charger controller 173 stops the charging (S216).

On the other hand, the charger controller 173 determines that it is permitted to switch the charging mode to the thermal management mode (Yes in S465), the charger controller 173 switches the charging mode to the thermal management mode (S480). Then, the charger controller 173 actuates the cooling device 200 (S485).

After S381, the BMS 138 stores the transmission history of the error message EM2 in the memory unit of the BMS 138 (S382). Then, the BMS 138 sets the demanded power in the battery charge demand message BCL to the low power LP1 (S390).

In the embodiment described above, the BMS 138 is configured to receive the charge fee setting information FD from the charger controller 173, but it is not limited thereto. For example, the charging system may further include a server configured to communicate with the vehicle controller 137 and the charger controller 173, and the charge fee setting information FD may be stored in the server. In this case, the BMS 138 acquires the charge fee setting information FD from the server. When the BMS 138 cannot obtain information about the charge fee setting information FD, the BMS 138 may store data indicating a charge history (information specifying the charging device, a history indicating the charging power and the elapsed time) and a charge fee in the server. In such a case, the BMS 138 may estimate the charge fee setting information of each charging device, and determine whether or not to switch the charging mode based on the estimation result of the charging fee setting information. Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A charging system comprising:
a charging device that includes a plug and a charger which supplies electric power to the plug;
a vehicle that includes an inlet to which the plug is connected and a power storage device to which electric power is supplied through the inlet; and
a notification device that notifies a user of information,
the charging device being capable of switching a charging mode from a normal charging mode to a power limited mode in which the charging power is smaller than that in the normal charging mode, and
when the charge fee required to complete the charging in the power limited mode is higher than the charge fee required to complete the charging in the normal charging mode, the notification device inquiring the user about whether or not to switch the charging mode to the power limited mode.

2. The charging system according to claim 1, wherein
the notification device includes an input unit that allows the user to input whether or not the user permits to switch the charging mode to the power limited mode,
the notification device transmits a stop signal for stopping the charging by the charging device when the user does not permit to switch the charging mode to the power limited mode.

3. The charging system according to claim 1, wherein
the notification device inquires the user about whether or not to switch the charging mode to the power limited mode if the charge fee increases as the charge time becomes longer.

4. The charging system according to claim 1, wherein
the vehicle includes a first temperature sensor that measures a temperature of the inlet,
when the temperature of the inlet becomes equal to or higher than a first predetermined temperature, the vehicle transmits a first notification to the charging device, and
upon receiving the first notification, the charging device switches the charging mode to the power limited mode when the charge fee required to complete the charging in the power limited mode is equal to or lower than the charge fee required to complete the charging in the normal charging mode.

5. The charging system according to claim 1, wherein
the charging device includes a second temperature sensor that measures a temperature of the plug, and
the charging device switches the charging mode to the power limited mode when the temperature of the plug is equal to or higher than a second predetermined temperature and the charge fee required to complete the charging in the power limited mode is equal to or lower than the charge fee required to complete the charging in the normal charging mode.

* * * * *